UNITED STATES PATENT OFFICE.

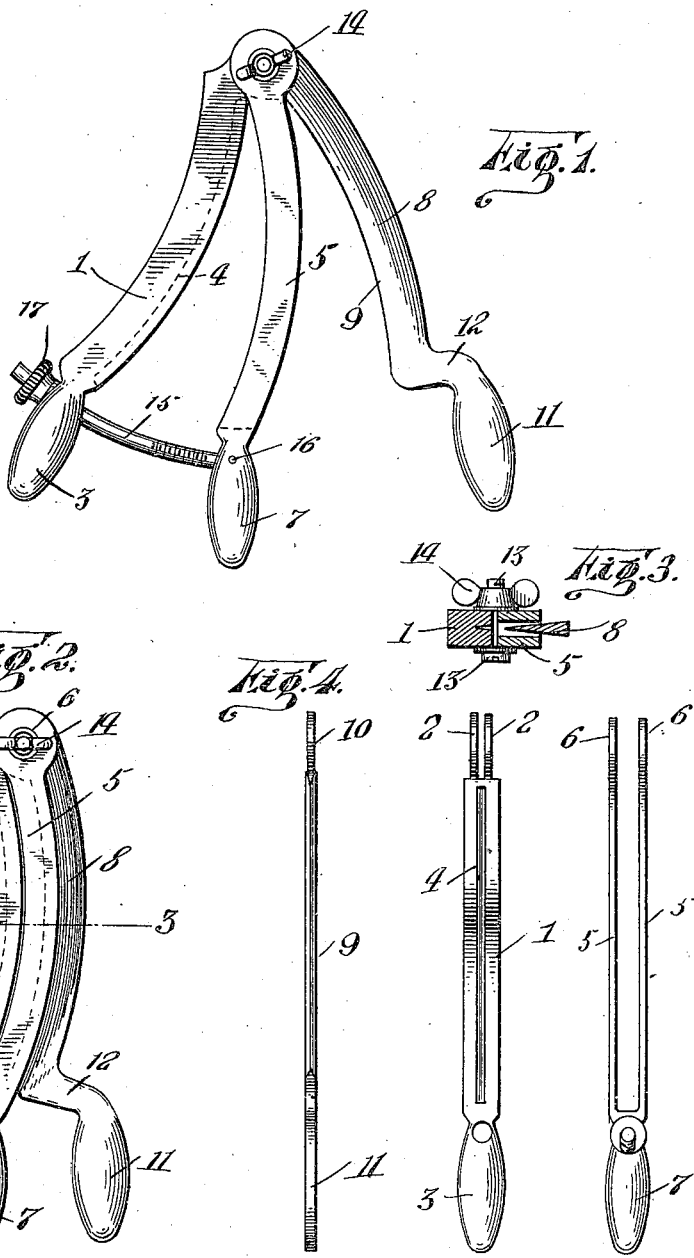

FREDERICK W. PORTER, OF TAMPA, FLORIDA.

DOG-EAR CUTTER.

964,182.

Specification of Letters Patent. Patented July 12, 1910.

Application filed January 24, 1910. Serial No. 539,810.

*To all whom it may concern:*

Be it known that I, FREDERICK W. PORTER, a citizen of the United States, residing at Tampa, in the county of Hillsboro and State of Florida, have invented certain new and useful Improvements in Dog-Ear Cutters, of which the following is a specification.

This invention relates to implements for cutting dogs' ears, and one of the principal objects of the invention is to provide a tool of simple construction which will firmly hold the ear of the dog in position to be cut and which will sever the ear at any point required.

Another object of the invention is to provide a device of simple construction, which will clamp the ear of the animal at the required point and cut the same off without permitting the ear to bleed, and to provide means whereby the operation will be practically painless to the animal.

These and other objects may be attained by means of the construction illustrated in the accompanying drawing, in which, Figure 1 is a side elevation of an implement for severing dogs' ears made in accordance with my invention, the implement being shown open. Fig. 2 is a similar view showing the implement closed. Fig. 3 is a transverse sectional view on the line 3—3 of Fig. 2, looking in the direction indicated by the arrow. Fig. 4 is an edge view of the cutting member. Fig. 5 is a similar view of one of the clamping members. Fig. 6 is a like view of the guide and clamping member.

Referring to the drawing the numeral 1 designates one of the clamping members, which is shown as curved and provided with spaced perforated lugs 2, at one end and a suitable handle 3, at the opposite end. This member is also provided with a longitudinal recess 4 to receive the cutting edge of the severing member. The guide for the severing member, which also serves as one member of the clamping device, consists of two parallel curved arms 5, suitably spaced apart and provided with perforated lugs 6 at one end and a suitable handle 7 at the opposite end. The severing member 8 is also curved on the arc of a circle of the same radius as the members 1 and 5, said severing member having a cutting edge 9, a perforated lug 10 at one end and a flat handle 11 at the opposite end, said handle being offset from the plane of the blade, as indicated at 12. The three members 1, 5 and 8 are pivotally connected by means of a screw 13, which extends through the perforated lugs 2, 6 and 10, said screw being fitted upon one end with a wing nut 14. The members 1 and 5 forming the clamp for holding the ear of the animal are connected together by means of a curved threaded rod 15, said rod being pivoted at 16 to the handle 7, while the opposite end of said rod extends through a perforation in the handle 3, said rod being fitted with a thumb-nut 17 for adjustably holding the members 1 and 5 together.

The manner of using the implement may be briefly described as follows: The animal's ear is clamped between the inner edges of the members 1 and 5 by turning the thumbnut 17 upon the rod 15. After the ear has been firmly clamped between these two members the severing member 8 is operated by means of the handle 11 to pass between the two members 5 and to sever the ear, the cutting edge 9 extending into the recess 4 in the member 1. Owing to the fact that the ear is firmly clamped before it is cut, the operation is rendered practically painless and at the same time owing to the clamped condition of the ear, the severing operation will not cause excessive bleeding.

From the foregoing it will be obvious that an implement made in accordance with my invention is of simple construction, can be manufactured at low cost, is strong, durable and efficient for its purpose, cannot readily get out of order and is quick of operation, is humane and reliable for its purpose.

Having thus fully described the invention what is claimed as new is:

1. An implement for severing dogs' ears comprising a curved clamp member provided with a perforated lug at one end, and a handle at the other end, a guide and clamp member comprising curved arms having a handle at one end and spaced perforated lugs at the other end, a severing member provided with a perforated lug at one end and an offset handle at the other end, a screw extending through the perforated lugs, a wing nut on said screw, a curved rod pivotally connected to the guide and clamp member, said rod extending through a perforation in the clamp member, and a thumb nut for holding the clamp members in adjusted positions.

2. An implement of the character described comprising a curved clamp member having a longitudinal recess therein and a handle at one end, a guide and clamp member having a handle at one end, a curved severing member provided with a handle, said members being pivotally connected together, a curved rod pivotally connected to the guide and clamp member, said rod extending through a perforation in the clamp member, and means for adjusting said members.

In testimony whereof I affix my signature in presence of two witnesses.

FREDERICK W. PORTER.

Witnesses:
T. M. SHACKLEFORD, Jr.,
M. CARABALLO, Jr.